(12) United States Patent
Bakewell et al.

(10) Patent No.: US 11,745,708 B2
(45) Date of Patent: Sep. 5, 2023

(54) CONTROLLER FOR A VEHICLE AND METHOD

(71) Applicant: JAGUAR LAND ROVER LIMITED, Coventry (GB)

(72) Inventors: Ryan Bakewell, Warwickshire (GB); Matthew Hancock, Warwickshire (GB); Olivier Roques, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 355 days.

(21) Appl. No.: 16/971,217

(22) PCT Filed: Jan. 29, 2019

(86) PCT No.: PCT/EP2019/052043
§ 371 (c)(1),
(2) Date: Aug. 19, 2020

(87) PCT Pub. No.: WO2019/162046
PCT Pub. Date: Aug. 29, 2019

(65) Prior Publication Data
US 2021/0101574 A1 Apr. 8, 2021

(30) Foreign Application Priority Data
Feb. 26, 2018 (GB) ...................................... 1803014

(51) Int. Cl.
*B60T 8/00* (2006.01)
*B60T 8/86* (2006.01)
(Continued)

(52) U.S. Cl.
CPC ............... *B60T 8/86* (2013.01); *B60T 8/245* (2013.01); *B60W 10/18* (2013.01);
(Continued)

(58) Field of Classification Search
CPC ........ B60T 2201/06; B60T 8/86; B60T 8/245; B60W 10/18; B60W 30/18063;
(Continued)

(56) References Cited

U.S. PATENT DOCUMENTS 8,793,035 B2 * 7/2014 Yu ....................... B60W 40/076
701/1
10,675,963 B2 * 6/2020 Matsuo .................. B60K 6/445
(Continued)

FOREIGN PATENT DOCUMENTS

CN 106143474 A 11/2016
DE 102005046015 A1 4/2006
(Continued)

OTHER PUBLICATIONS

International Search Report and Written Opinion, PCT/EP2019/052043, dated Jun. 6, 2019.
(Continued)

*Primary Examiner* — Truc M Do
(74) *Attorney, Agent, or Firm* — McCoy Russell LLP

(57) ABSTRACT

A controller for a vehicle, a system, a vehicle, a method, a computer program and a non-transitory computer-readable storage medium are disclosed. The controller is configured to receive an indication of a measured speed of the vehicle, and determine whether a gradient on which the vehicle is located is below a threshold gradient. The controller is also configured to provide an output signal to cause a brake of the vehicle to be automatically applied to hold the vehicle stationary, in dependence on: the received indication of the measured speed of the vehicle being below a threshold speed; and the determination that the gradient is below the threshold gradient.

19 Claims, 11 Drawing Sheets

(51) Int. Cl.
  *B60T 8/24* (2006.01)
  *B60W 10/18* (2012.01)
  *B60W 30/18* (2012.01)
  *B60W 40/076* (2012.01)
  *B60W 40/105* (2012.01)

(52) U.S. Cl.
  CPC ............... *B60W 30/18063* (2013.01); *B60W 30/18118* (2013.01); *B60W 40/076* (2013.01); *B60W 40/105* (2013.01); *B60W 2520/04* (2013.01); *B60W 2520/10* (2013.01); *B60W 2540/12* (2013.01); *B60W 2552/15* (2020.02)

(58) Field of Classification Search
  CPC ......... B60W 30/18118; B60W 40/076; B60W 40/105; B60W 2552/15; B60W 2520/04; B60W 2520/10; B60W 2540/12
  See application file for complete search history.

(56) References Cited

U.S. PATENT DOCUMENTS

2002/0005662 A1* 1/2002 Yasui .................. B60T 8/172
                                                        303/175
2012/0150384 A1   6/2012 Jung et al.
2013/0253731 A1*  9/2013 Kanou ............... B60W 40/076
                                                        701/1
2014/0277980 A1*  9/2014 Yu .................... B60W 30/18118
                                                        701/70
2014/0358388 A1  12/2014 Adams et al.

FOREIGN PATENT DOCUMENTS

EP     2799693 A1    11/2014
FR     2927040 A1     8/2009
GB     2523177 A      8/2015
GB     2527512 A     12/2015
WO  2016068773 A1    5/2016

OTHER PUBLICATIONS

Combined Search and Examination Report, GB 1803014.8, dated Aug. 1, 2018.
State Intellectual Property Office of the People's Republic of China, Office Action and Search Report Issued in Application No. 201980015057.X, dated Dec. 26, 2022, 12 pages. (Submitted with Partial Translation).

* cited by examiner

CONTROLLER FOR A VEHICLE AND METHOD

CROSS-REFERENCE TO RELATED APPLICATIONS

This application is a 371 of International Application No. PCT/EP2019/052043, filed Jan. 29, 2019, which claims priority to GB Patent Application 1803014.8, filed Feb. 26, 2018, the contents of both of which are incorporated by reference herein in their entirety.

TECHNICAL FIELD

The present disclosure relates to a controller for a vehicle and a method. In particular, but not exclusively it relates to a controller for a vehicle and a method for controlling application of brakes of a road vehicle, such as a car.

Aspects of the invention relate to a controller, a system, a vehicle, a method, a computer program and a non-transitory computer-readable storage medium having instructions stored therein.

BACKGROUND

In vehicles with an internal combustion engine and an automatic transmission, it is common for a vehicle to have a "creep" function such that, without any torque being requested by the driver, a small amount of torque is provided to road wheels to cause movement of the vehicle by up 10 kilometres per hour. This "creep torque" can simplify low speed maneuvering because it allows a driver to modulate speed of the vehicle using just the brake pedal. The "creep" function originates from the behavior of the torque converter of the transmission of such vehicles, but it is not an inherent property of an electric vehicle. In some electric vehicles a creep function has been implemented in the powertrain controller, and in some of these vehicles the creep function is a selectable option to the driver. In other electric vehicles no such creep function is provided.

An advantage of having no creep torque is that the driver is able to modulate speed of the vehicle using only the accelerator pedal, particularly when off-accelerator regeneration is high.

A disadvantage of having no creep torque is that when the vehicle is brought to rest on a relatively flat road without applying braking torque, after a small period of time the vehicle may start to roll in either direction, possibly in a manner that is imperceptible to the driver.

It is an aim of the present invention to address disadvantages of the prior art.

SUMMARY OF THE INVENTION

Aspects and embodiments of the invention provide a controller, a system, a vehicle, a method, a computer program and a non-transitory computer-readable storage medium as claimed in the appended claims.

According to an aspect of the invention there is provided a controller for a vehicle, the controller being configured to: receive an indication of a measured speed of the vehicle; determine whether a gradient on which the vehicle is located is below a threshold gradient; and provide an output signal to cause a brake of the vehicle to be automatically applied to hold the vehicle stationary, in dependence on: the received indication of the measured speed of the vehicle being below a threshold speed; and the determination that the gradient is below the threshold gradient.

This provides the advantage that if the vehicle is stopped on a slope with a small gradient and the brakes are not applied by the driver, the brakes will be automatically applied to hold the vehicle stationary. Consequently, excessive rolling of the vehicle without the driver being aware of such movement is avoided.

According to another aspect of the invention there is provided a controller for a vehicle, the controller comprising input means configured to receive an indication of a measured speed of the vehicle; processing means configured to determine whether a gradient on which the vehicle is located is less than a threshold gradient, and determine whether the received indication of the measured speed of the vehicle is less than a threshold speed; and output means configured to provide an output signal to cause a brake of the vehicle to be automatically applied to hold the vehicle stationary, in dependence on: a determination that the measured speed of the vehicle is less than the threshold speed; and a determination that the gradient is less than the threshold gradient.

According to yet another aspect of the invention there is provided a controller for a vehicle, the controller comprising input means configured to receive an indication of a measured speed of the vehicle; processing means configured to determine whether the received indication of the measured speed of the vehicle is less than a threshold speed over a period of defined duration; and output means configured to provide an output signal to cause a brake of the vehicle to be automatically applied to hold the vehicle stationary, in dependence on a determination that the measured speed of the vehicle is less than the threshold speed over the period of defined duration.

In some embodiments the input means and the output means are provided by a transceiver configured to enable communication over a data bus.

In some embodiments the controller is configured to determine whether the gradient is below the threshold gradient by monitoring the indication of measured speed of the vehicle over a first period of time. This provides the advantage that the gradient may be easily measured without the use of additional sensors such as an inertial measurement unit.

In some embodiments the controller is configured to determine whether the gradient is below the threshold gradient by determining whether the measured speed of the vehicle remains within a first speed range, including zero, for a first period of time that has a predefined first duration. This provides the advantage that the gradient may be easily measured, and also only allows the brakes to be applied after a period of time in which the vehicle has been at least approximately stationary.

In some embodiments the controller is configured to receive indications of depressions of at least one user operable pedal, and provide the output signal to cause the brake of the vehicle to be automatically applied after the expiration of the first period of time with the predefined first duration, only after a predefined pedal release period has elapsed during which the at least one user operable pedal is not depressed. This provides the advantage that if a user keeps the vehicle stationary, for example by resting their foot on the brake pedal, and then they release the pedal without taking any further action, the brakes may be automatically applied.

In some embodiments the controller is configured to provide the output signal in dependence on the measured speed of the vehicle either having crossed zero since the start of the first period of time or having been within a second range that is smaller than the first range and which includes zero since the start of the first period of time. This provides the advantage that, provided the second range is sufficiently small, the brakes are only automatically applied when the vehicle is, or has recently been, brought to a halt. Consequently, the vehicle may be driven at very low speeds without the brakes being automatically applied when they are not required.

In some embodiments the controller is configured to provide the output signal in dependence on the measured speed of the vehicle either having crossed zero or having been zero since the start of the first period of time. This provides the advantage that the brakes are only automatically applied when the vehicle is, or has recently been, brought to a halt. Consequently, the vehicle may be driven at very low speeds without the brakes being automatically applied when they are not required.

In some embodiments the controller is configured to receive indications of depressions of at least one user operable pedal, and in dependence on the at least one user operable pedal being depressed, provide an output signal to cause brakes of the vehicle to be automatically applied only after the expiration of a second period of time in which the indication of measured speed is within the first speed range; and the second period of time has a predefined second duration that is longer than the predefined first duration.

In some embodiments the controller is configured to: receive indications of torque demand; and provide an output signal to cause brakes of the vehicle to be automatically applied only after the expiration of the second period of time in dependence on receiving an indication of a torque demand being received.

In some embodiments the controller is configured to receive the indication of the measured speed of the vehicle from a sensing means configured to measure speed of rotation of an electric motor arranged to drive the vehicle.

In some embodiments the vehicle is an electric vehicle.

In some embodiments the controller is configured to: receive an indication of a selected direction of travel; and provide the output signal only when said indication is received.

In some embodiments the controller comprises an electronic memory device and having instructions stored therein; and an electronic processor electrically coupled to the electronic memory device and configured to access the electronic memory device and execute the instructions.

According to another aspect of the invention there is provided a system comprising the controller of any one of the previous paragraphs and a brake system configured to apply a brake in dependence on receiving the output signal from the controller.

In some embodiments the system comprises a sensor for providing the indication of measured speed of the vehicle and the sensor is arranged to measure rotational speed of a motor of the vehicle.

According to yet another aspect of the invention there is provided a vehicle comprising the controller of any one of the previous paragraphs or the system of any one of the previous paragraphs.

According to a further aspect of the invention there is provided a method for controlling application of a brake on a vehicle, the method comprising: receiving an indication of a measured speed of the vehicle; determining whether a gradient on which the vehicle is located is below a threshold gradient; and causing brakes of the vehicle to be applied to hold the vehicle stationary, in dependence on: the received indication of the measured speed of the vehicle being below a threshold speed; and the determination that the gradient is below the threshold gradient.

In some embodiments said determining whether the gradient is below the threshold gradient comprises monitoring the indication of measured speed of the vehicle over a first period of time.

In some embodiments said determining whether the gradient is below the threshold gradient comprises determining whether the measured speed of the vehicle remains within a first speed range, including zero, for a first period of time that has a predefined first duration.

In some embodiments the method comprises receiving indications of depressions of at least one user operable pedal, and providing the output signal to cause the brake of the vehicle to be automatically applied after the expiration of the first period of time with the predefined first duration, only after a pedal release period has elapsed during which the at least one user operable pedal is not depressed.

In some embodiments the method comprises providing the output signal in dependence on the measured speed of the vehicle either having crossed zero or having been within a second range that is smaller than the first range and which includes zero since the start of the first period of time.

In some embodiments the method comprises providing the output signal in dependence on the measured speed of the vehicle either having crossed zero or having been zero since the start of the first period of time.

In some embodiments the method comprises receiving indications of depressions of at least one user operable pedal, and in dependence on the at least one user operable pedal being depressed, providing an output signal to cause brakes of the vehicle to be automatically applied only after the expiration of a second period of time in which the indication of measured speed is within the first speed range; and the second period of time has a predefined second duration that is longer than the predefined first duration.

In some embodiments the method comprises receiving indications of torque demand; and providing an output signal to cause brakes of the vehicle to be automatically applied only after the expiration of the second period of time in dependence on receiving an indication of a torque demand being received.

In some embodiments the method comprises receiving the indication of the measured speed of the vehicle from a sensor which measures the rotational speed of an electric motor arranged to drive the vehicle.

In some embodiments the method comprises: receiving an indication of a selected direction of travel; and providing the output signal only when said indication is received.

According to yet another aspect of the invention there is provided a computer program which when executed by a processor causes the processor to perform the method according to any one of the previous paragraphs.

According to a further aspect of the invention there is provided a non-transitory computer-readable storage medium having instructions stored therein which when executed on a processor cause the processor to perform the method according to any one of the previous paragraphs.

According to yet another aspect of the invention there is provided a controller for a vehicle, the controller being configured to: receive an indication of a measured speed of the vehicle;

and provide an output signal to cause actuation of brakes of the vehicle in dependence on the measured speed of the vehicle being within a range of speeds that includes zero throughout a period having a predefined first duration.

In some embodiments the controller is configured to only provide the output signal when the measured speed of the vehicle at some time during the period has been zero or the measured speed of the vehicle has crossed zero.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
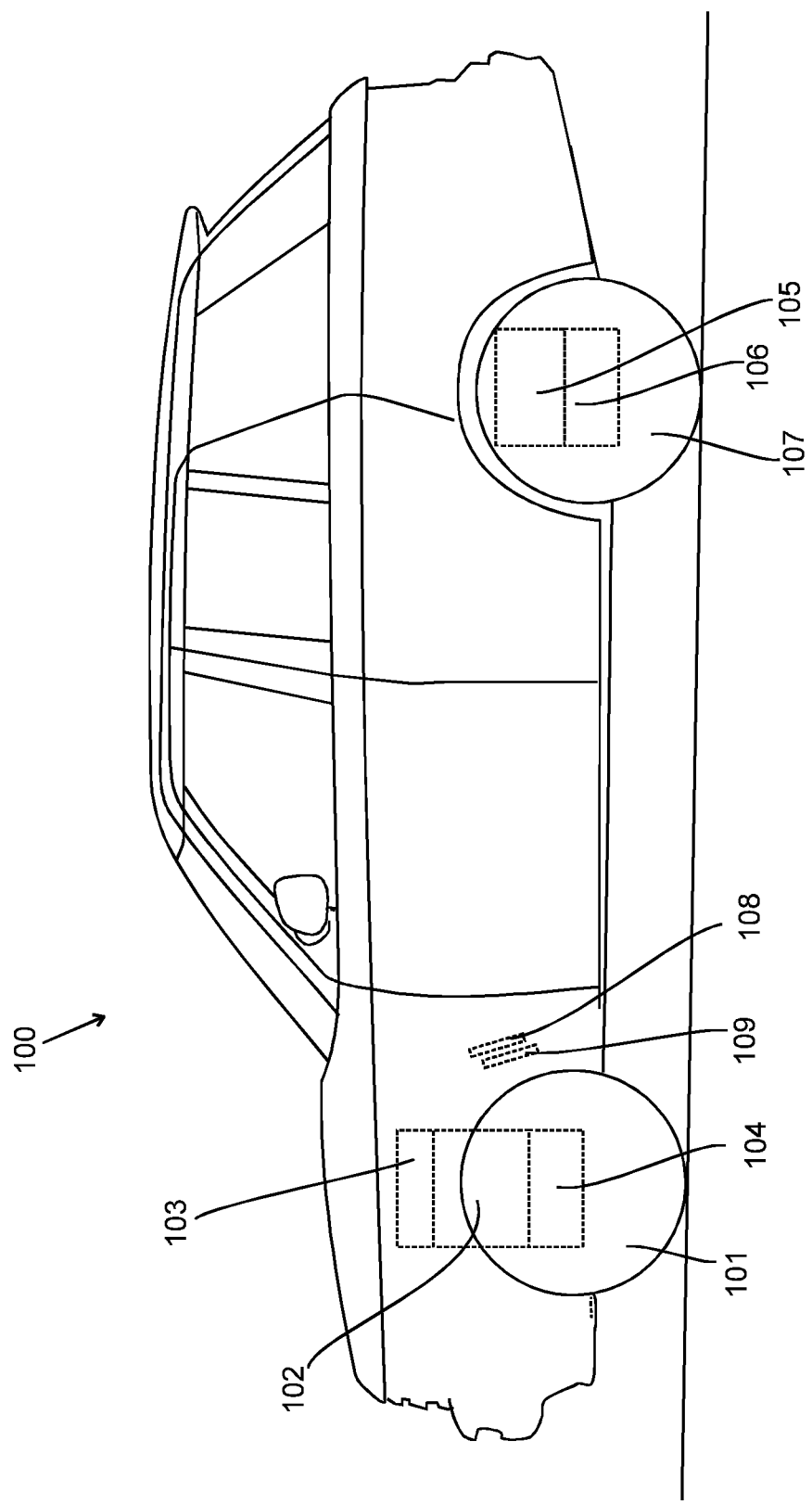
FIG. 1 shows a road vehicle embodying the present invention.

A road vehicle 100 embodying the present invention is shown in FIG. 1. In the present embodiment the vehicle 100 is a car having an electric motor 102 arranged to provide torque to front wheels 101 via a transmission system 104 under the control of a powertrain control module 103. The vehicle 100 also has a second electric motor 105 arranged to provide torque to rear wheels 107 via a second transmission system 106, but it will be appreciated that in other embodiments, the vehicle 100 may just have a single electric motor that drives either the front wheels 101 or the rear wheels 107.

The vehicle 100 is shown in FIG. 1 after having been stopped on a road with a slight uphill gradient of 1 or 2 degrees to the horizontal. The vehicle 100 was brought to rest by the driver (not shown) releasing the accelerator pedal 108 and without depressing the brake pedal 109. The vehicle 100 may be momentarily kept in its present position by frictional resistance to rolling, but the vehicle 100 may start to roll unexpectedly, for example, triggered by movement of people in the vehicle 100 or a gust of wind. If the driver is not paying attention, the movement of the vehicle 100 may go unnoticed. However, the vehicle 100 is provided with a system (200 shown in FIG. 2) which automatically causes the brakes (209 in FIG. 2) of the vehicle 100 to be applied to hold the vehicle 100 stationary and prevent undesirable movement of the vehicle 100.

Figure 2:
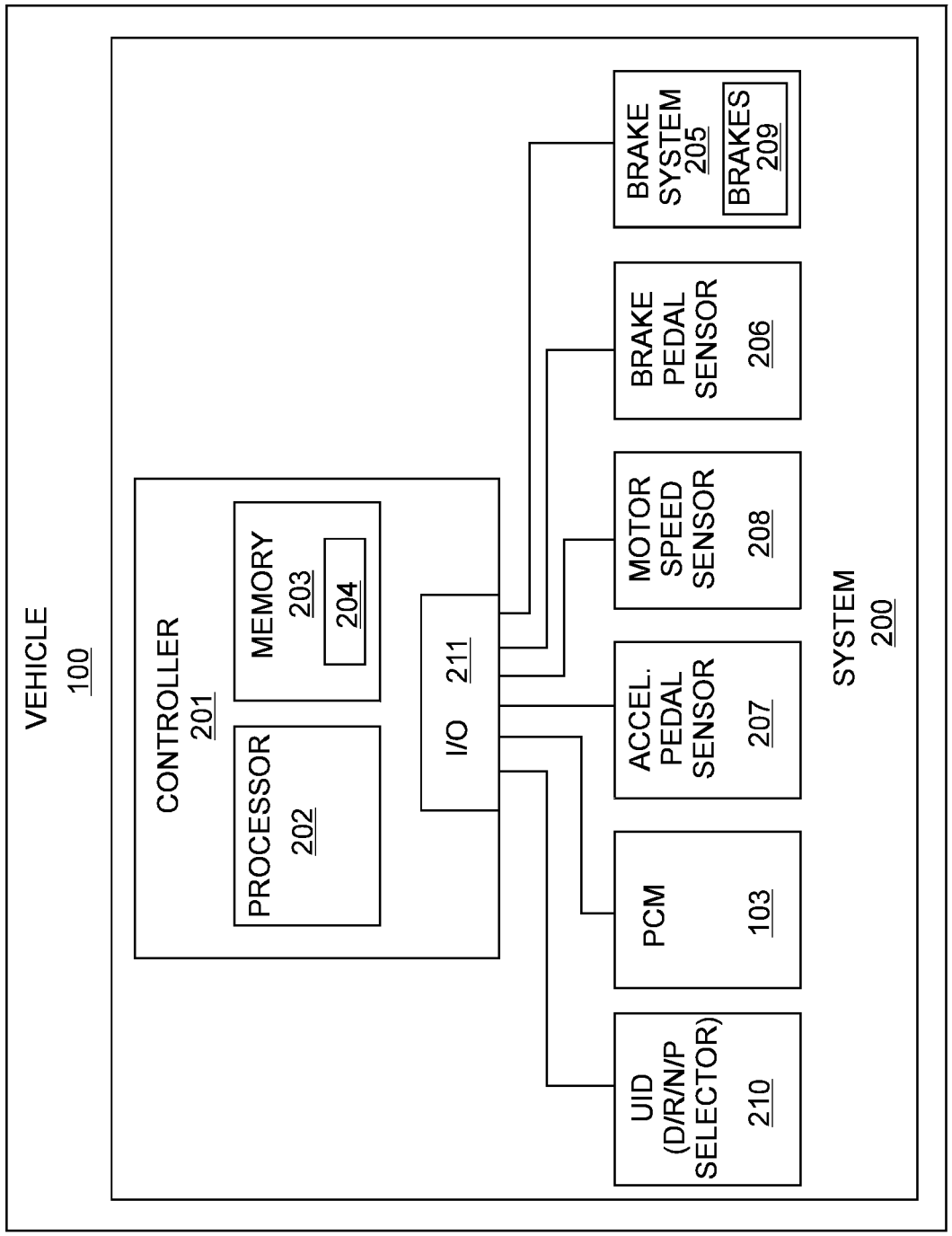
FIG. 2 shows a schematic diagram of a system for automatically causing brakes of the vehicle to be applied to hold the vehicle stationary.

A schematic diagram of a system 200 for automatically causing brakes 209 of the vehicle 100 to be applied to hold the vehicle 100 stationary is shown in FIG. 2. The system 200 comprises a controller 201. The controller 201 comprises an electronic processor 202 and an electronic memory device 203 having instructions 204 stored therein. The electronic processor 202 is electrically coupled to the electronic memory device 203 and it is configured to access the electronic memory device 203 and execute the instructions 204, to cause the controller 201 to perform the processes that will be described below.

The controller 201 comprises input/output means 211 to enable signals to be received by the controller 201 from other components of the vehicle 100 and to enable the controller 201 to transmit signals to other components of the vehicle 100. In an embodiment, the input/output means 211 may be provided by a transceiver configured to enable communication over a data bus.

The controller 201 is configured to receive signals from a brake pedal sensor 206 configured to detect pressure being applied to the brake pedal 109 and provide a signal to the controller 201 indicative of whether or not the brake pedal 109 has been pressed.

The controller 201 is also configured to receive signals indicative of whether or not the driver of the vehicle 100 is requesting torque by depression of the accelerator pedal 108. In the present embodiment, these signals are received from an accelerator pedal sensor 207 configured to detect the position of the accelerator pedal 108 and provide signals indicative of depression or release of the accelerator pedal 108 to the controller 201.

The controller 201 is also configured to receive signals from a motor speed sensor 208 indicative of the rotational velocity of the electric motor 102, which is also indicative of the speed of the vehicle 100. Due to the gear ratio of the transmission system 104, the electric motor 102 turns many times for each revolution of the driven wheels 101. Consequently, measurement of the rotational velocity of the electric motor 102 provides a very accurate indication of speed of the vehicle 100, even at very low speeds of the vehicle 100. This enables the controller 201 to determine from the received signals when the vehicle 100 is stationary with a relatively small measurement error.

It is noted that the word "speed" generally refers to a scalar quantity equal to the magnitude of a velocity, and therefore it is always positive. However, "speed of the vehicle", "measured speed" or "vehicle speed" as used herein refers to a scalar quantity with a positive sign for forward motion of the vehicle 100 and a negative sign for backward motion of the vehicle.

The vehicle 100 comprises a user input device 210 configured to enable a user to select a direction of travel, i.e. drive or reverse (D or R), or alternatively neutral or park (N or P). The controller 201 is configured to receive signals indicative of whether a direction of travel is currently selected. In the present embodiment the indication of the selected direction of travel is received from the user input device 210 but in alternative embodiments it may be received from the powertrain control module 103.

The controller 201 is configured to provide output signals to a brake system 205 to cause the brakes 209 of the vehicle 100 to be applied to hold the vehicle 100 stationary. The brake system 205 may be an antilock braking system. The output signals are provided by the controller 201 in dependence on the indications of speed received from the motor speed sensor 208 and a determination that the gradient on which the vehicle 100 is positioned is less than a threshold gradient. In the present embodiment, the controller 201 determines that the gradient is less than a threshold gradient when the magnitude of the speed of the vehicle 100 is less than a threshold speed throughout a predefined period of time. For example, the threshold speed may be set at 1 kilometre per hour. In some embodiments, the threshold speed is dependent on the direction of movement of the vehicle 100, but in either case the controller 201 determines that the gradient is less than a threshold gradient when the speed of the vehicle 100 remains within a first range of speeds that includes zero during the predefined period. For example, in an embodiment the first range is from −1 kilometer per hour to +1 kilometer per hour.

The time at which the output signal is provided by the controller 201 depends on whether the brake pedal sensor 206 indicates that the brake pedal 109 is depressed and/or the accelerator pedal sensor 208 indicating that the accelerator pedal 108 is depressed.

In some embodiments, the powertrain control module 103 has a creep function that causes the motor 102 to provide a small amount of torque when drive is selected and the accelerator pedal is not depressed. In such an embodiment, the creep function may be switched on or off by a user input device, and the controller is only configured to automatically cause the brakes to be applied, when the creep function is switched off. Similarly, in some embodiments, the vehicle 100 has a driver assist function, such as an autonomous cruise control system, and a user input device to enable a user to switch on or off the driver assist function. In such an embodiment the controller 201 is only configured to automatically cause the brakes to be applied, when the driver assist function is switched off.

Figure 3:
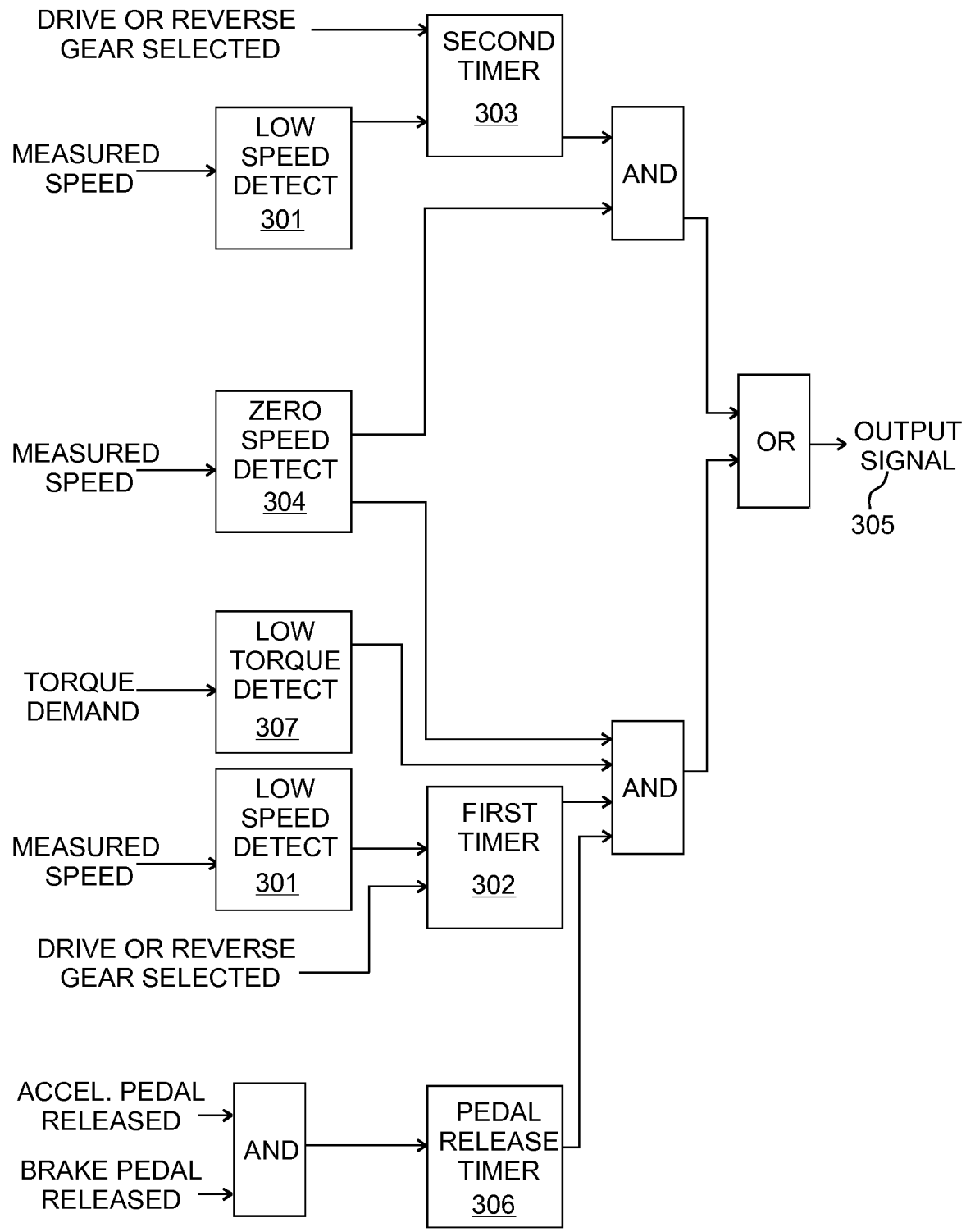
FIG. 3 shows a functional flow block diagram illustrating operations performed by a controller embodying the present invention.

A functional flow block diagram illustrating operations performed by the controller 201 is shown in FIG. 3. The controller 201 is configured to receive the measured speed of the vehicle 100 and perform a low speed detection function 301 to detect when the speed of the vehicle 100 is within a first range of speeds that includes zero. When the measured speed is within the first range of speeds, an indication of this is provided to a first timer 302 and also to a second timer 303.

The first timer 302 and the second timer 303 are arranged to start only when they receive an indication that the measured speed is within the first range of speeds and that the drive or reverse directions of travel have been selected by the driver. If the measured speed goes outside of the first range of speeds and/or the drive or reverse are deselected, the timers 302 and 303 are stopped and reset.

The first timer 302 times a first period that has a predefined first duration and the second timer times a second period having a predefined second duration that is longer than the predefined first duration. Typically the predefined first duration is about 2 seconds.

The first timer 302 is arranged to provide an output to indicate when the first period has expired and the output is maintained by the first timer 302 while ever the measured speed remains within the first range of speeds and the drive/reverse selection is maintained. Similarly, the second timer 303 provides an output to indicate when the second period has expired and the output is maintained by the second timer while ever the measured speed remains within the first range of speeds and the drive/reverse selection is maintained.

The controller 201 is also configured to perform a zero speed detection function 304 in which the measured speeds received by the controller 201 are compared to a second range of speeds that includes zero. The second range of speeds is substantially smaller than the first range of speeds and is typically arranged to be approximately equal to zero plus or minus the measurement accuracy of the motor speed sensor 208. For example, the second range of speeds may be from −0.1 to +0.1 kilometres per hour, or even smaller. The zero speed detection function 304 is configured to provide an output indicating that the vehicle 100 is stationary when a measured speed is within the second range of speeds.

In instances when the vehicle 100 is driven forwards and stopped, and then it rolls backwards, the measured speed changes from a positive value to a negative value indicating that the speed of the vehicle 100 has crossed zero. Similarly when the vehicle 100 is driven in reverse and stopped, and then it rolls forwards, the measured speed changes from a negative value to a positive value indicating that the speed of the vehicle 100 has crossed zero. The zero speed detection function 304 is also configured to detect when the speed of the vehicle 100 has crossed zero and provide an indication that the vehicle 100 is stationary when this is detected.

When the second timer 303 provides an output indicating that the second period of second duration has been exceeded and the zero speed detection function 304 indicates that the vehicle 100 is stationary, the controller 201 is configured to provide an output signal 305 to the brake system 205 to request that the brake system 205 to apply the brakes 209 to hold the vehicle 100 stationary.

The request for brakes to be applied is latched until any one of a second set of requirements is met. The second set of requirements may comprise: the brake system 205 confirming that the brakes 209 have been applied; selection of neutral (rather than drive or reverse); confirmation that the park pawl is engaged when park is selected (rather than drive or reverse); a driver pressing the accelerator pedal to cause the vehicle to be moved in the selected direction of travel; a driver pressing the brake pedal, which indicates that the driver is taking control of the vehicle; creep function or a driver assist function being switched on.

The controller 201 is also configured to receive a signal from the accelerator pedal sensor 208 indicative of when the accelerator pedal 108 is being depressed, and, in the present embodiment, receive a signal from the brake pedal sensor 206 indicative of when the brake pedal 109 is being depressed. The controller 201 comprises a pedal release timer 306 arranged to: start when these signals both indicate that the pedals 108 and 109 have gone from a pressed state to a released state; and stop and reset when the signals indicate that either of the pedals 108 and 109 has gone from a released state to a pressed state.

The pedal release timer 306 is configure to provide an output when the period from it being started exceeds a predefined pedal release duration, and to maintain the output while ever both the accelerator pedal 108 and the brake pedal 109 continue to be released. In the present embodiment, the predefined pedal release duration is about 0.5 seconds.

The controller 201 is also configured to provide a low torque detection function 306, in which a received signal indicating the current powertrain torque demand is compared to a small threshold value and to indicate when the powertrain torque demand is low, i.e. less than that threshold value.

The controller 201 is configured to provide an output signal 305 to the brake system 205 to cause the brake system 205 to apply the brakes 209 to hold the vehicle 100 stationary when: the first timer 302 provides an output indicating that the first period of first duration has been exceeded; the zero speed detection function 304 indicates that the vehicle 100 is stationary; the pedal release timer 306 indicates that the pedals 108 and 109 have been released for at least the predefined pedal release duration; and the low torque detection function 307 indicates that the powertrain torque demand is low.

Thus, the controller 201 is configured to automatically provide an output signal 305 to the brake system 205 to cause the brake system 205 to apply the brakes 209 to hold the vehicle 100 stationary, after a period of time of defined duration has elapsed beginning when the measured speed is within the first range of speeds. If the powertrain torque demand is low, and the accelerator pedal 108 and the brake pedal 109 are both released, the output signal 305 may be provided after a relatively short first period of time measured by the first timer 302. Alternatively, if either of the pedals 108 and 109 is depressed and/or the torque demand of the powertrain is high, the output signal 305 may be provided only after a relatively longer second period of time measured by the second timer 303.

It may be noted that if the brake pedal 109 and accelerator pedal 108 are both released and the speed of the vehicle 100 remains less than a threshold speed for the duration of the first period, timed by the first timer 302, this indicates that the gradient on which the vehicle 100 is positioned is less than a threshold gradient. i.e. if the vehicle 100 were on a steeper slope it would accelerate more rapidly and its speed would not remain within the first range of speeds used by the low speed detection function 301 for the whole period measured by the first timer 302.

In an alternative embodiment, the controller 201 is configured to receive a signal from a gradient sensing means which may comprise an inertial measurement unit. The gradient sensing means or the controller 201 may be configured to determine when the gradient measured by the gradient sensing means is less than a predefined threshold gradient. The controller 201 may then be arranged to provide the output signal 305 to the brake system 205 when: the sensed gradient is below the threshold gradient; the measured speed is below a threshold speed (or within a first range); and a direction of travel (drive/reverse) is selected. Therefore, in such an embodiment, the first timer 302 is not necessary. It will be understood that the implementation of the second timer is also optional.

In alternative embodiments, the second timer 303 is omitted and the controller 201 only provides an output signal when: the first timer 302 has exceeded its predefined duration; the measured speed remains within the first range; the measured speed has been zero or crossed zero since the first timer was started; a direction of travel (drive/reverse) is selected; and at least the accelerator pedal is not depressed. In other alternative embodiments, the first timer 302 is omitted and the controller 201 only provides an output signal when: the second timer 303 has exceeded its predefined duration; the measured speed remains within the first range; the measured speed has been zero or crossed zero since the second timer 303 was started; and a direction of travel (drive/reverse) is selected.

In addition or alternatively, the controller 201 may not include the zero speed detection function 304 and it may be configured to provide the output signal 305 whenever drive or reverse are selected and either the second timer 303 has timed out or the first timer 302 and the pedal release timer 306 have timed out.

In an alternative embodiment, the pedal release timer 306 is started in dependence on receiving an indication of the accelerator pedal 108 being released and does not depend on the brake pedal 109 being released.

Graphs illustrating some examples of the behavior of the controller 201 are shown in FIGS. 4 to 7. Each one of FIGS. 4 to 7 shows four graphs with time along the horizontal axis. Along the vertical axis the graphs show, from top graph to bottom graph: vehicle speed; accelerator pedal pressure; brake pedal pressure; and the output signal 305 from the controller 201 to the brake system 205 to request application of the brakes 209.

Figure 4:
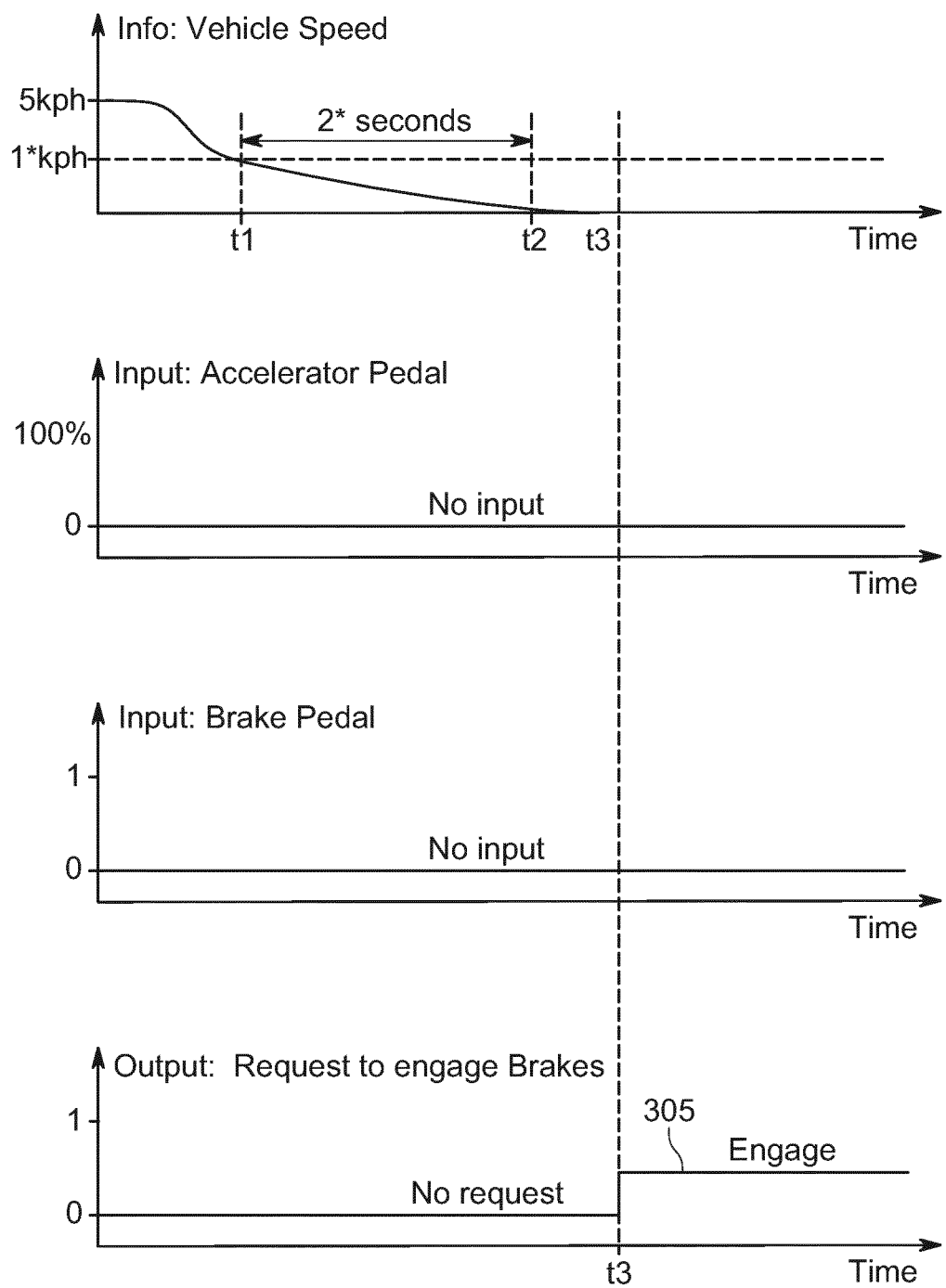
FIGS. 4, 5, 6 and 7 each show four graphs illustrating some examples of the behavior of the controller.

In FIG. 4, the vehicle 100 is slowing down from a speed of 5 kilometres per hour. When the speed becomes less than a threshold speed of 1 kilometre per hour at time t1, the first timer 302 is started and it continues to run as the speed remains below the 1 kilometre per hour threshold speed. At time t2 the first timer exceeds its predefined first duration, in this case 2 seconds, and the vehicle 100 is still not stationary. Consequently, in terms of FIG. 3, the zero speed detection function 304 has not yet provided a necessary output to enable the controller 201 to provide its output signal 305 to the brake system 205. Shortly after t2, at time t3 the vehicle 100 becomes stationary as determined by the zero speed detection function 304. The brake pedal 109 and the accelerator pedal 108 are never depressed during this example, and therefore when the vehicle 100 becomes stationary at t3, the controller 201 provides an output signal 305 to request the brake system 205 to apply the brakes 209.

Figure 5:
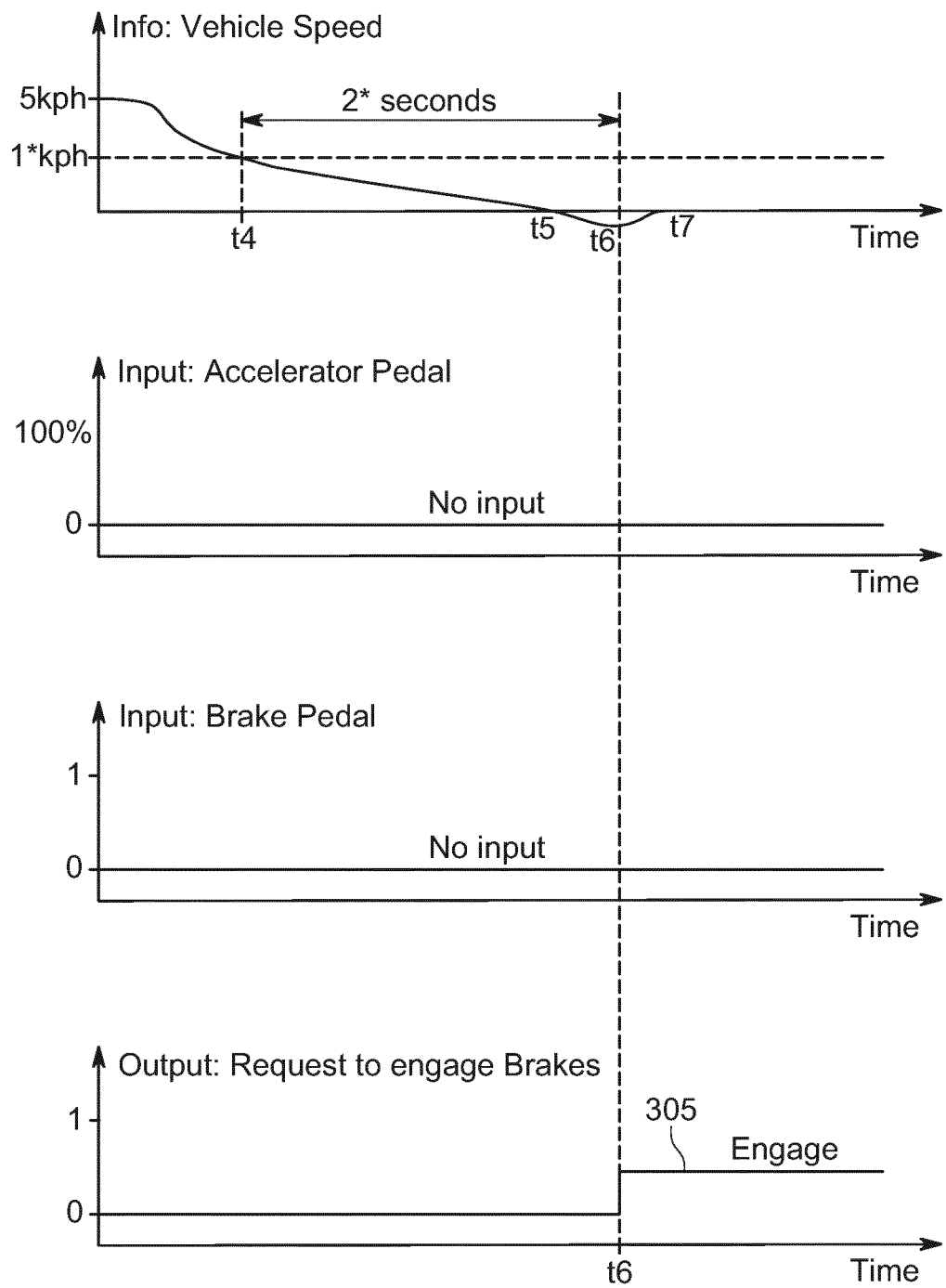

In FIG. 5, the vehicle 100 is slowing down from a speed of 5 kilometres per hour. When the speed becomes less than a threshold speed of 1 kilometre per hour at time t4, the first timer 302 is started and it continues to run as the speed remains below the 1 kilometre per hour threshold speed. In less than 2 seconds of t4, at time t5, the speed goes through 0 kilometres per hour and becomes negative as the vehicle 100 rolls backwards in the opposite direction to its initial direction of travel. Therefore, in terms of FIG. 3, the zero speed detection function 304 detects that the speed has crossed zero at time t5 and provides an output signal to indicate this. Then at time t6, the first timer 302 reaches its predefined duration of 2 seconds, and because the accelerator pedal 108 and the brake pedal 109 have not been depressed, and the magnitude of the speed of the vehicle 100 has been below the threshold speed of 1 kilometre per hour since the first timer started at time t4, the controller 201 provides an output signal 305 at time t6. The application of the brakes 209 at t6, caused by the output signal 305, slows the vehicle 100 back down to zero kilometres per hour at time t7.

Figure 6:
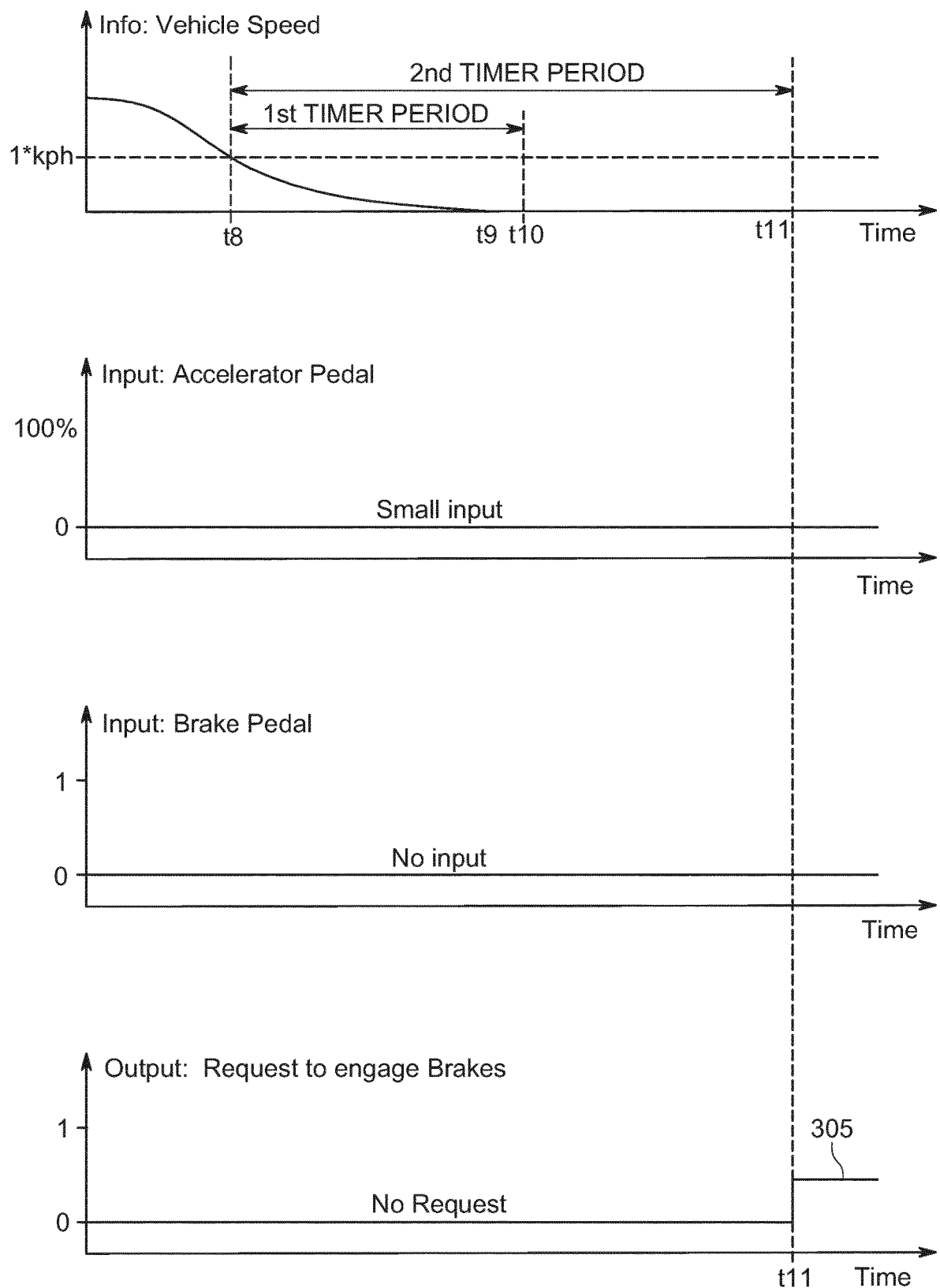

In FIG. 6, the graphs illustrate the vehicle 100 slowing down on an uphill gradient while a small input is received at the accelerator pedal 108. The speed of the vehicle 100 goes below a threshold speed of the 1 kilometre per hour at time t8 and the first and second timers 302 and 303 are started. The speed then becomes at time t9, and remains at 0 kilometres per hour because the torque generated by the electric motor 102 is just sufficient to hold the vehicle 100 stationary on the uphill gradient. Following t9, at t10, which is 2 seconds after time t8, the first timer 302 times out but the controller 201 is unable to provide an output signal 305 to the brake system 205 because the driver is still pressing the accelerator pedal 108 to keep the vehicle 100 stationary. Later, at t11 the second timer 303 times out and consequently the controller 201 provides the output signal 305 to the brake system.

Figure 7:
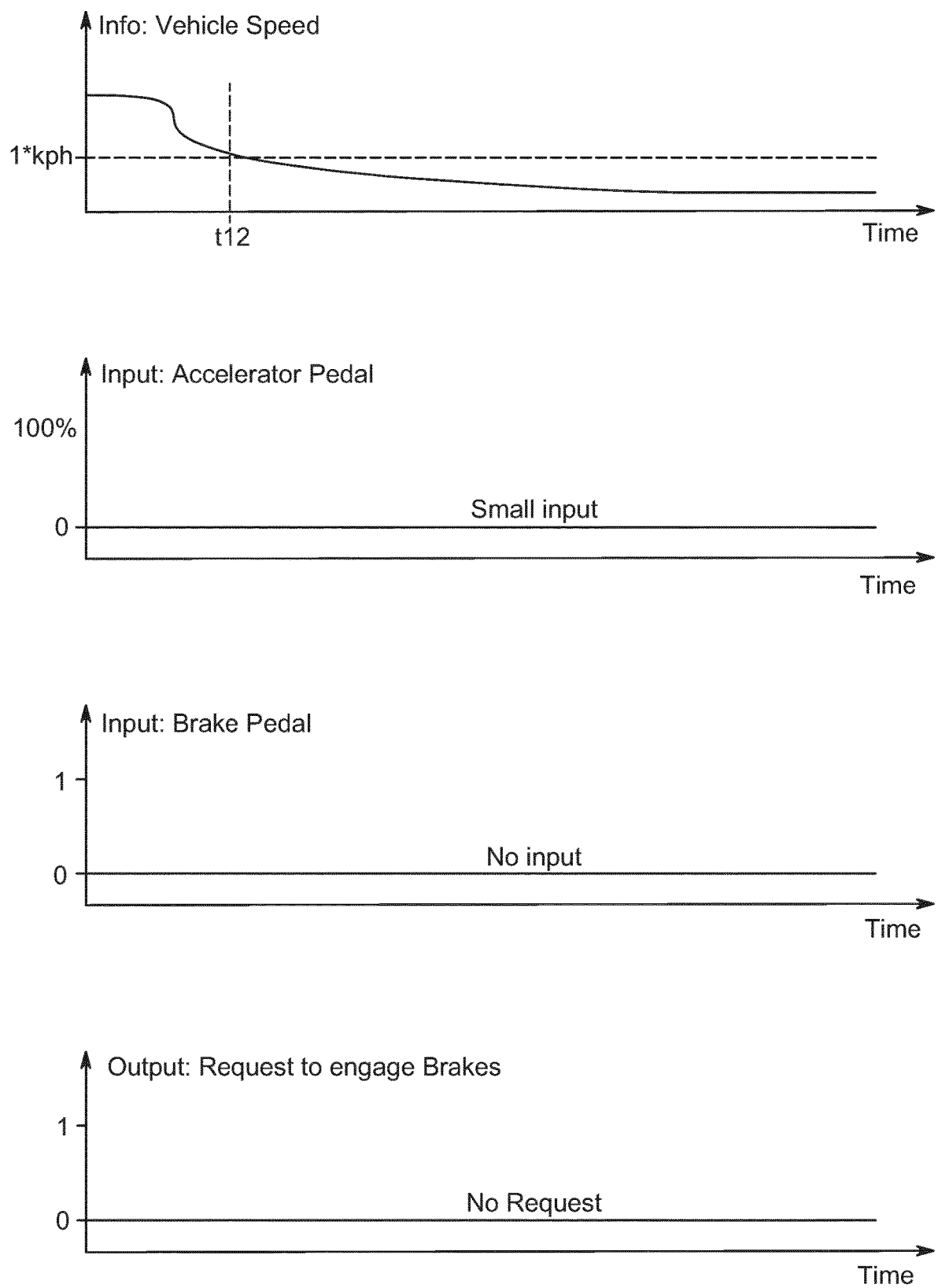

In FIG. 7, the vehicle 100 is slowing down while a small input is received at the accelerator pedal. The speed of the vehicle 100 goes below a threshold speed of the 1 kilometre per hour at time t12, but it never becomes stationary. Consequently in terms of FIG. 3, the zero speed detection function 304 does not provide an output indicating that the vehicle 100 is stationary and so the controller 201 is not enabled to provide an output signal 305. The driver is therefore able to drive the vehicle 100 at very low speeds without interference of automatic brake application.

Figure 8:
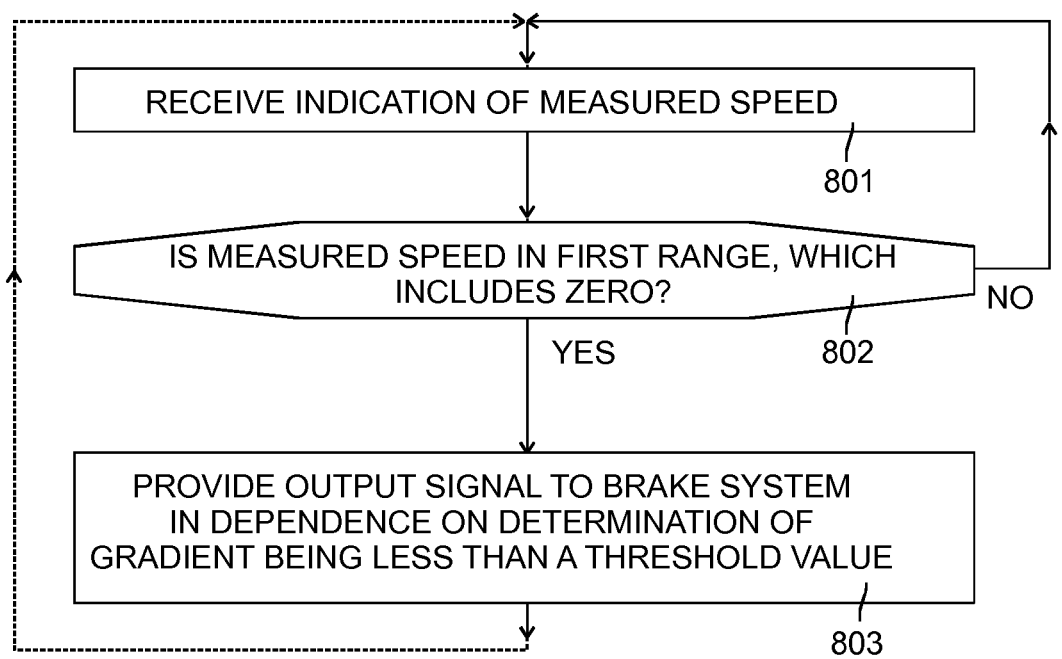
FIG. 8 shows a flowchart illustrating a method performable by the controller.

A flowchart illustrating a method 800 performable by the controller 201 is shown in FIG. 8. At block 801 of the method 800, an indication of measured speed of the vehicle 100 is received. At block 802 it is determined whether the measured speed is in a first range of speeds that includes zero. If the measured speed is not in the first range, then the processes at blocks 801 and 802 are repeated. If the measured speed is determined to be in the first range at block 802, an output signal is provided to a brake system 205 at block 803 in dependence on a determination that a gradient on which the vehicle 100 is positioned is less than a threshold gradient. The method 800 may then be repeated.

Figure 9:
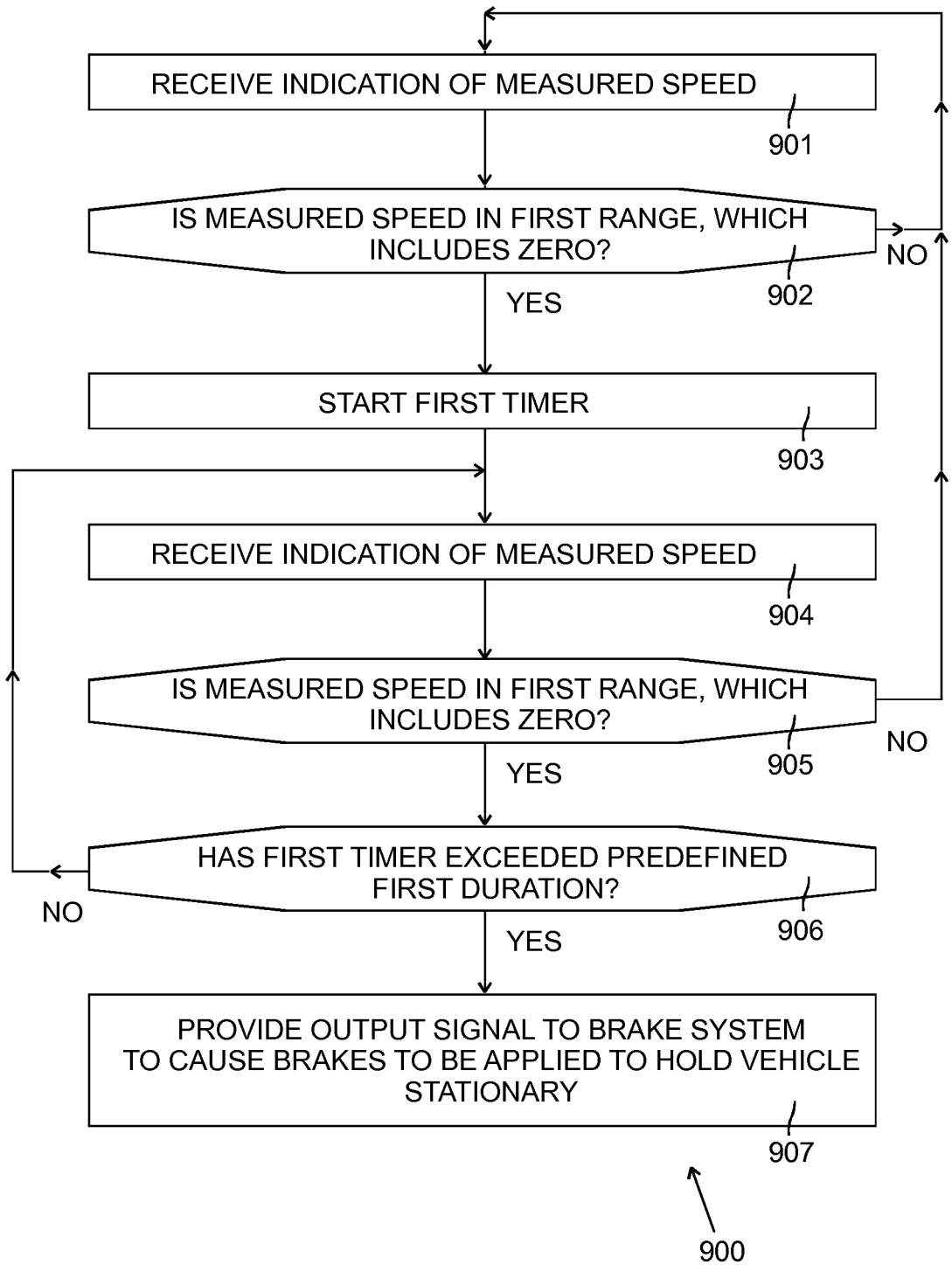
FIG. 9 shows a flowchart illustrating a second method performable by the controller.

A flowchart illustrating a second method 900 performable by the controller 201 is shown in FIG. 9, in which the determination that the gradient is less than a threshold gradient is achieved by monitoring speed of the vehicle 100. At block 901 of the method 900, an indication of measured speed of the vehicle 100 is received. At block 902 it is determined whether the measured speed is in a first range of speeds that includes zero. If the measured speed is not in the first range, then the processes at blocks 901 and 902 are repeated.

If the measured speed is determined to be in the first range at block 902, a first timer is started at block 903 and another indication of measured speed is received at block 904. At block 905 it is determined if the measured speed is still in the first range and if it is not the processes at blocks 901 and 902 are repeated until the speed is once again in the first range.

If it is determined at block 905 that the speed is still in the first range, it is determined at block 906 whether the first timer 302 has exceeded a first duration. If it has not, then the processes at blocks 904, 905 and 906 are repeated until it is determined at block 906 that the first timer has exceeded the first duration. When that happens, at block 907 an output signal is provided to the brake system 205 to cause it to apply the brakes 209.

Figure 10:
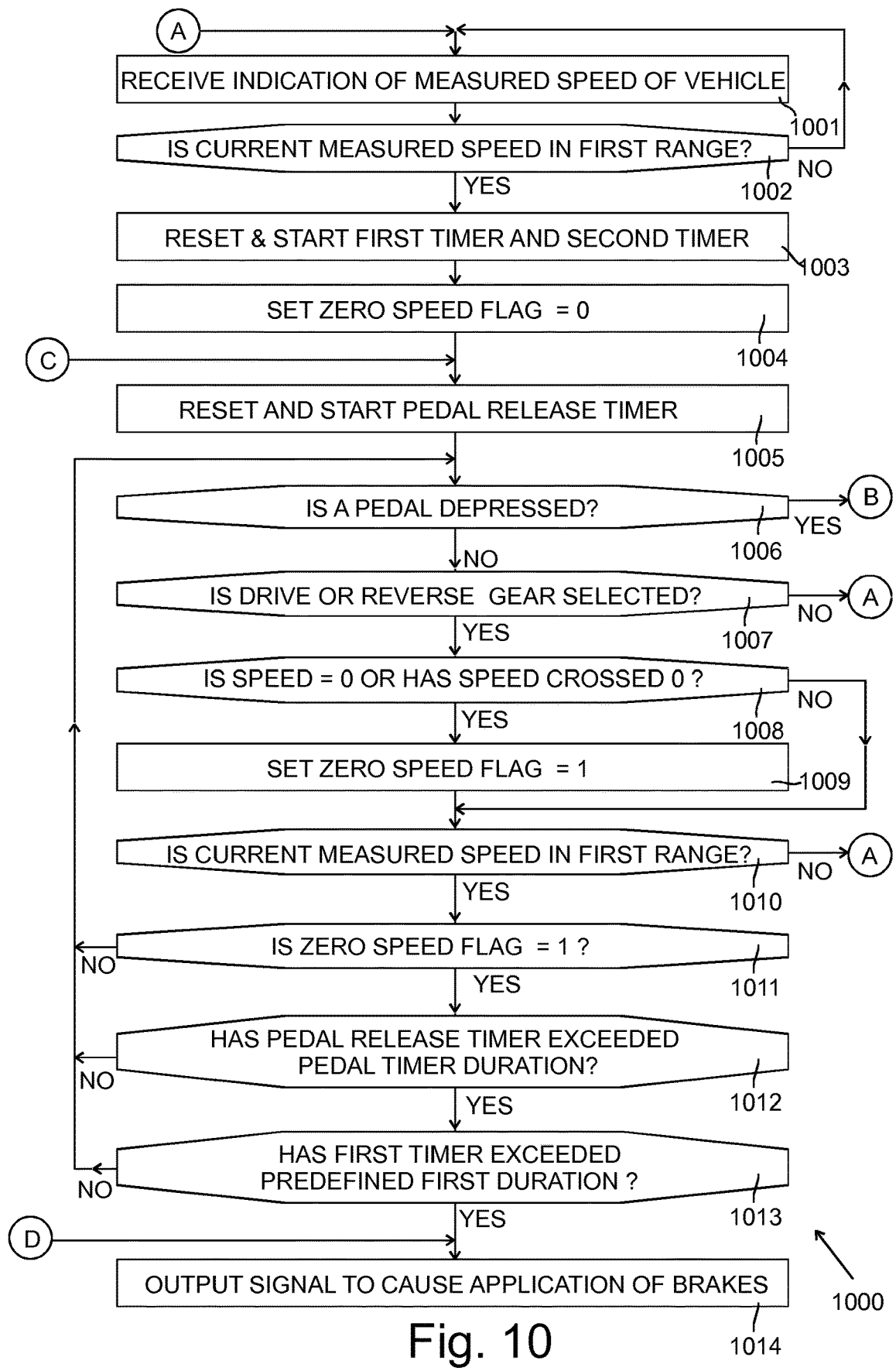
FIGS. 10 and 11 show a flowchart illustrating a third method performable by the controller.
Figure 11:
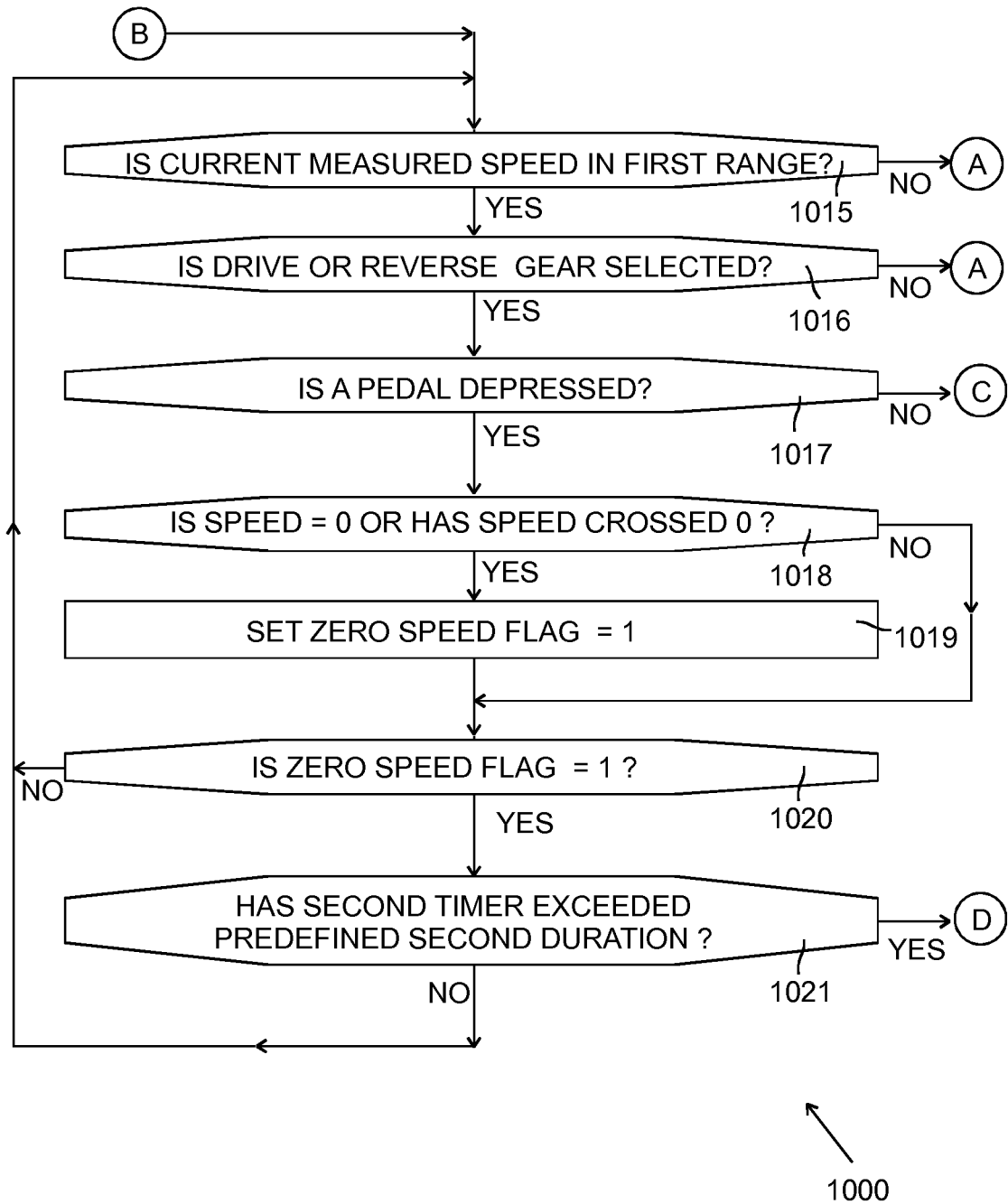

A flowchart illustrating a third method 1000 performable by the controller 201 is shown in FIGS. 10 and 11. At block 1001 of the method 1000, an indication of measured speed of the vehicle 1000 is received. At block 1002 it is determined whether the measured speed is in a first range of speeds that includes zero. If the measured speed is not in the first range, then the processes at blocks 1001 and 1002 are repeated.

If the measured speed is determined to be in the first range at block 1002, a first timer 302 and a second timer 303 are reset and started at block 1003 and a zero speed flag is reset to zero at block 1004. A pedal release timer 306 is then reset to zero and started at block 1005. At block 1006 it is determined whether a pedal is depressed. As described above with reference to FIG. 3, the pedal concerned may be the accelerator pedal but in the present embodiment it is determined at block 1006 whether either of the accelerator pedal or the brake pedal is depressed. If the pedals concerned are both released, then it is determined at block 1007 whether or not drive or reverse has been selected by the driver. If the drive or reverse has been deselected, for example if the user has selected neutral or park, the method 1000 returns to block 1001.

Otherwise, if drive or reverse are found to be selected at block 1007, it is determined at block 1008 whether the current measured speed is zero or if the measured speed has crossed zero, i.e. the measured speed has changed sign indicating a change in direction of the vehicle 100. If the current measured speed is zero or if the measured speed has crossed zero, the zero speed flag is set to 1 at block 1009.

At block 1010 it is determined whether the current measured speed is still in the first range, and if it is not then the method returns to block 1001. If the current measured speed is still in the range, then at block 1011 it is determined whether the zero speed flag is set to 1. If it is, then it is determined at block 1012 whether the pedal release timer 306 has exceeded a pedal timer duration, i.e. it is determined whether a predefined pedal release period (for example, with a duration of 0.5 seconds) has elapsed since the pedal release timer 306 was started at block 1005. If it has, then it is determined at block 1013 whether the first timer has exceeded a first duration. If it has, then an output signal is provided at block 1014, for example to the brake system 206 to cause application of brakes 209.

If any of the determinations at blocks 1011, 1012 or 1013 give a negative result, then the processes at blocks 1006 to 1013 are repeated as necessary. If during the repeating of the processes at blocks 1007 and 1010 it is determined that the drive or reverse are no longer selected, or the speed is no longer within the first range, then the method 1000 returns to block 1001.

In an alternative embodiment, if it is determined at block 1006 that a pedal is depressed, then the method 1000 simply returns to block 1001. However, in the present embodiment, if it is determined at block 1006 that a pedal is depressed, then a process at block 1015 is performed, which is shown on FIG. 11. At block 1015 it is determined whether the current measured speed is still in the first range and, if it is, it is determined at block 1016 whether drive or reverse are selected. If it is, then the process at block 1017 is performed. However, if either of the processes at blocks 1015 and 1016 provide a negative result, then the method 1000 returns to block 1001 (FIG. 10).

At block 1017 it is determined whether a pedal is still being depressed and, if it is, it is determined at block 1018 whether the current measured speed is zero or if the speed has crossed zero. The process at block 1018 is therefore like that of block 1008. If the current measured speed is zero or if the speed has crossed zero then the zero speed flag is set to 1 at block 1019.

At block 1020 it is determined whether the zero speed flag is set to 1 and, if it is, it is determined at block 1021 if the second timer 303 has exceed a second duration. As mentioned above, the second duration is longer than the first duration. If the second timer 303 has exceeded the second duration, then the output is provided at block 1014 to cause the brakes 209 to be applied. If the processes at blocks 1020 or 1021 provide a negative result, the method returns to block 1015 and the processes at blocks 1015 to 1020 and 1021 are repeated.

If it is determined at block 1017 that no pedal is being depressed then the pedal release timer 306 is reset and started at block 1005 (shown in FIG. 10) and the method 1000 may continue with the processes of blocks 1006 to 1014 as described above. When returning to block 1005 from block 1017 it is possible that the first timer has already timed out and that the vehicle 100 has been noted as being stationary at blocks 1018 and 1019. In such a case, the expiry of the pedal release timer 306 may be all that is still required for the output signal to be provided at block 1014.

Therefore, for example, if the pedal timer duration is 0.5 seconds, then the brakes 209 may be automatically applied in accordance with block 1014, 0.5 seconds after the pedals are released.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM or EEPROM); flash memory; or electrical or other types of medium for storing such information/instructions.

The blocks illustrated in the FIGS. 8 to 11 may represent steps in a method and/or sections of code in the computer program 204. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A controller for a vehicle, the controller being configured to:
   receive an indication of a measured speed of the vehicle;
   determine whether a gradient on which the vehicle is located is below a threshold gradient; and
   provide an output signal to cause a brake of the vehicle to be automatically applied to hold the vehicle stationary, based at least in part on:
   the received indication of the measured speed of the vehicle being below a threshold speed; and
   the determination that the gradient is below the threshold gradient, wherein the controller is configured to determine whether the gradient is below the threshold gradient by determining whether the measured speed of the vehicle remains within a first speed range including zero for a first period of time that has a predefined first duration.

2. The controller according to claim 1, wherein the controller is configured to determine whether the gradient is below the threshold gradient by monitoring the indication of measured speed of the vehicle over a first period of time.

3. The controller according to claim 1, wherein the controller is further configured to receive indications of depressions of at least one user operable pedal.

4. The controller according to claim 1, wherein the controller is configured to provide the output signal based on at least one selected from the group consisting of:
   the measured speed of the vehicle having crossed zero since the start of the first period of time,
   the measured speed of the vehicle having been within a second range that is smaller than the first range and which includes zero since the start of the first period of time, and
   the measured speed of the vehicle either having crossed zero or having been zero since the start of the first period of time.

5. The controller according to claim 3, wherein the controller is further configured to, based at least in part on the at least one user operable pedal being depressed, provide an output signal to cause the brake of the vehicle to be automatically applied only after the expiration of a second period of time in which the indication of measured speed is within the first speed range.

6. The controller according to claim 5, wherein the controller is further configured to:
   receive indications of torque demand; and
   provide an output signal to cause the brake of the vehicle to be automatically applied only after the expiration of the second period of time based at least in part on receiving an indication of a torque demand being received.

7. The controller according to claim 1, wherein the controller is further configured to:
   receive an indication of a selected direction of travel; and
   provide the output signal only when said indication is received.

8. The controller according to claim 1, wherein the controller comprises:
   an electronic memory device having instructions stored therein; and
   an electronic processor electrically coupled to the electronic memory device and configured to access the electronic memory device and execute the instructions.

9. A system comprising the controller of claim 1 and a brake system configured to apply a brake based at least in part on receiving the output signal from the controller.

10. A vehicle comprising the controller of claim 1.

11. A method for controlling application of a brake on a vehicle, the method comprising:
    receiving an indication of a measured speed of the vehicle;
    determining whether a gradient on which the vehicle is located is below a threshold gradient; and
    causing a brake of the vehicle to be applied to hold the vehicle stationary, based at least in part on: the received indication of the measured speed of the vehicle being below a threshold speed; and the determination that the gradient is below the threshold gradient, wherein determining whether the gradient is below the threshold gradient comprises determining whether the measured speed of the vehicle remains within a first speed range, including zero, for a first period of time that has a predefined first duration.

12. The method according to claim 11, wherein said determining whether the gradient is below the threshold gradient includes monitoring the indication of measured speed of the vehicle over a first period of time.

13. A computer program which when executed by a processor causes the processor to perform the method according to claim 12.

14. A non-transitory computer-readable storage medium having instructions stored therein which when executed on a processor cause the processor to perform the method according to claim 12.

15. The controller according to claim 3, wherein the controller is further configured to provide the output signal to cause the brake of the vehicle to be automatically applied after the expiration of the first period of time with the predefined first duration, only after a predefined pedal release period has elapsed during which the at least one user operable pedal is not depressed.

16. The controller according to claim 5, wherein the second period of time has a predefined second duration that is longer than the predefined first duration.

17. A system comprising the controller of claim 8 and a brake system configured to apply a brake based at least in part on receiving the output signal from the controller.

18. A vehicle comprising the controller of claim 8.

19. A vehicle comprising the system of claim 9.

* * * * *